(12) United States Patent
Krause et al.

(10) Patent No.: US 7,022,149 B2
(45) Date of Patent: *Apr. 4, 2006

(54) SINGLE CHAMBER COMPACT FUEL PROCESSOR

(75) Inventors: Curtis L. Krause, Katy, TX (US); James F. Stevens, Katy, TX (US); Jennifer L. Phan, Rosharon, TX (US)

(73) Assignee: Texaco Inc., San Ramon, CA (US)

( * ) Notice: Subject to any disclaimer, the term of this patent is extended or adjusted under 35 U.S.C. 154(b) by 741 days.

This patent is subject to a terminal disclaimer.

(21) Appl. No.: 10/023,313

(22) Filed: Dec. 13, 2001

(65) Prior Publication Data

US 2002/0088740 A1    Jul. 11, 2002

Related U.S. Application Data

(60) Provisional application No. 60/255,348, filed on Dec. 13, 2000.

(51) Int. Cl.
*B01J 7/00*    (2006.01)

(52) U.S. Cl. ............... 48/61; 48/62 R; 48/127.9; 48/128; 48/198.1; 48/198.7; 422/188; 422/190; 422/191; 422/192; 422/193; 422/198; 422/200; 422/211; 422/222

(58) Field of Classification Search .......... 48/61, 48/62 R, 127.9, 128, 198.1, 198.7; 422/188–193, 422/198, 200, 211, 222
See application file for complete search history.

(56) References Cited

U.S. PATENT DOCUMENTS

| | | | |
|---|---|---|---|
| 3,398,968 A | 8/1968 | White et al. | |
| 3,996,016 A | 12/1976 | Wagner | |
| 4,405,562 A | 9/1983 | Zardi et al. | |
| 5,330,727 A | 7/1994 | Trocciola et al. | |
| 5,874,051 A | 2/1999 | Heil et al. | |
| 5,997,594 A | 12/1999 | Edlund et al. | |
| 6,086,839 A | 7/2000 | Autenrieth et al. | |
| 6,096,286 A | 8/2000 | Autenrieth | |
| 2002/0083646 A1 | 7/2002 | Deshpande et al. | |
| 2002/0090326 A1 | 7/2002 | Deshpande | |
| 2002/0090327 A1 | 7/2002 | Deshpande | |
| 2002/0090328 A1 | 7/2002 | Deshpande | |
| 2002/0090334 A1 | 7/2002 | Stevens et al. | |
| 2002/0094310 A1 | 7/2002 | Krause et al. | |
| 2002/0098129 A1 | 7/2002 | Martin et al. | |

FOREIGN PATENT DOCUMENTS

| | | | |
|---|---|---|---|
| EP | 977293 A2 | * | 2/2000 |
| WO | WO 9808771 A2 | * | 3/1998 |
| WO | WO 9936351 A1 | * | 7/1999 |
| WO | WO 200072954 A1 | * | 12/2000 |

* cited by examiner

*Primary Examiner*—Glenn Caldarola
*Assistant Examiner*—Vinit H. Patel
(74) *Attorney, Agent, or Firm*—Howrey Simon; Frank C. Turner

(57) ABSTRACT

An apparatus for carrying out a multi-step process of converting hydrocarbon fuel to a substantially pure hydrogen gas feed includes a plurality of reaction zones arranged in a common reaction chamber. The multi-step process includes: providing a fuel to the fuel processor so that as the fuel reacts and forms the hydrogen rich gas, the intermediate gas products pass through each reaction zone as arranged in the reactor to produce the hydrogen rich gas.

14 Claims, 3 Drawing Sheets

SINGLE CHAMBER COMPACT FUEL PROCESSOR

CROSS REFERENCE TO RELATED APPLICATION

This application claims the benefit of U.S. Provisional Application 60/255,348 filed Dec. 13, 2000.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage that inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Despite the above work, there remains a need for a simple unit for converting a hydrocarbon fuel to a hydrogen rich gas stream for use in conjunction with a fuel cell.

SUMMARY OF THE INVENTION

The present invention is generally directed to an apparatus and method for converting hydrocarbon fuel into a hydrogen rich gas. In one illustrative embodiment of the present invention, a compact fuel processor for converting a hydrocarbon fuel feed into hydrogen rich gas, in which the fuel processor assembly includes a cylinder having an inlet end and an outlet end, wherein the cylinder is loaded with a plurality of catalysts in series fashion thus forming a series of reaction zones; and a heat exchanger having an inlet end and an outlet end, wherein the heat exchanger is internally positioned through the length of the cylinder so as to provide heat or remove heat as required by a particular reaction zone. Within such an illustrative embodiment, the plurality of catalysts includes autothermal reforming catalyst, desulfurization catalyst, water gas shift catalyst, preferential oxidation catalyst, and mixtures and combinations of these and similar catalysts. The hydrocarbon fuel feed utilized in the illustrative fuel processor is preheated, preferably by passing through the heat exchanger prior to being introduced to the cylinder or alternatively by a fuel pre-heater located in a function upstream position from the autothermal reforming reaction zone. A wide variety of hydrocarbon fuels may be utilized, however, in one illustrative embodiment the hydrocarbon fuel is selected from natural gas, gasoline, diesel, fuel oil, propane, liquefied petroleum, methanol, ethanol or other similar and suitable hydrocarbons and mixtures of these.

One of skill in the art should also understand and appreciate that another illustrative embodiment of the present invention includes a compact fuel processor for converting a hydrocarbon fuel feed to hydrogen rich gas, that is composed of a reaction chamber; a plurality of predefined reaction zones within said reaction chamber, wherein each reaction zone is characterized by the chemical reaction that takes place within the reaction zone.; and a heat exchanger having an inlet end and an outlet end, wherein the heat exchanger is positioned at least partially within the reaction chamber. In one such illustrative embodiment, a first reaction zone contains autothermal reforming catalyst, a second reaction zone contains desulfurization catalyst, a third reaction zone contains water gas shift catalyst, and a reaction zone module contains preferential oxidation catalyst. When considering such an illustrative embodiment, it is contemplated that the heat exchanger is not substantially positioned within the first reaction zone. The hydrocarbon fuel feed for one illustrative embodiment is preheated by passing through the heat exchanger prior to being introduced to the reaction chamber. Alternatively, the mixture of hydrocarbon fuel feed, air, and water is preheated by passing through the heat exchanger prior to being introduced to the first reaction zone. A wide variety of hydrocarbon fuels as noted above may be utilized.

It should be appreciated by one of skill in the art that each reaction zone of the plurality of reaction zones may contain one or more catalysts. In one such illustrative embodiment, the catalysts are selected from autothermal reforming catalyst, desulfurization catalyst, water gas shift catalyst, preferential oxidation catalyst as well as mixtures and combinations of these and similar catalysts. Any particular reaction zone containing more than one catalyst may be separated from an adjacent reaction zone by a permeable plate that also serves to support the adjacent reaction zones. In one illustrative embodiment, the plate is selected from perforated metal, metal screen, metal mesh, sintered metal, porous ceramic, or combinations of these materials and similar materials. It is preferred within such an illustrative embodiment that the plate be at least partially composed of INCONEL® (a trademark registered for use in association with nickel alloys and alloys of nickel, chromium and iron), carbon steel, and stainless steel.

The present invention also includes a process for converting hydrocarbon fuel into a hydrogen rich gas. One such illustrative process utilizes the apparatus disclosed herein. Such a process generally includes providing a fuel processor having a reactor chamber in which a plurality of catalysts have been loaded. The flow of the reactant gas through the reactor chamber is such that each area of the reaction chamber forms series of discrete reaction zone. By feeding the hydrocarbon fuel successively through each of the reaction zones in a predetermined manner, a hydrogen rich gas is produced in a manner that optimizes space considerations and heat transfer considerations.

BRIEF DESCRIPTION OF THE DRAWINGS

The description is presented with reference to the accompanying drawings in which.

DESCRIPTION OF ILLUSTRATIVE EMBODIMENTS

The present invention is generally directed to an apparatus for converting hydrocarbon fuel into a hydrogen rich gas. In a preferred aspect, the apparatus and method described herein relate to a compact processor for producing a hydrogen rich gas stream from a hydrocarbon fuel for use in fuel cells. However, other possible uses are contemplated for the apparatus and method described herein, including any use wherein a hydrogen rich stream is desired. Accordingly, while the invention is described herein as being used in conjunction with a fuel cell, the scope of the invention is not limited to such use.

Each of the illustrative embodiments of the present invention describe a fuel processor or a process for using such a fuel processor with the hydrocarbon fuel feed being directed through the fuel processor. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The fuel processor feeds include hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below.

The fuel processor effluent stream from of the present invention includes hydrogen and carbon dioxide and can also include some water, unconverted hydrocarbons, carbon monoxide, impurities (e.g. hydrogen sulfide and ammonia) and inert components (e.g., nitrogen and argon, especially if air was a component of the feed stream).

Figure 1:
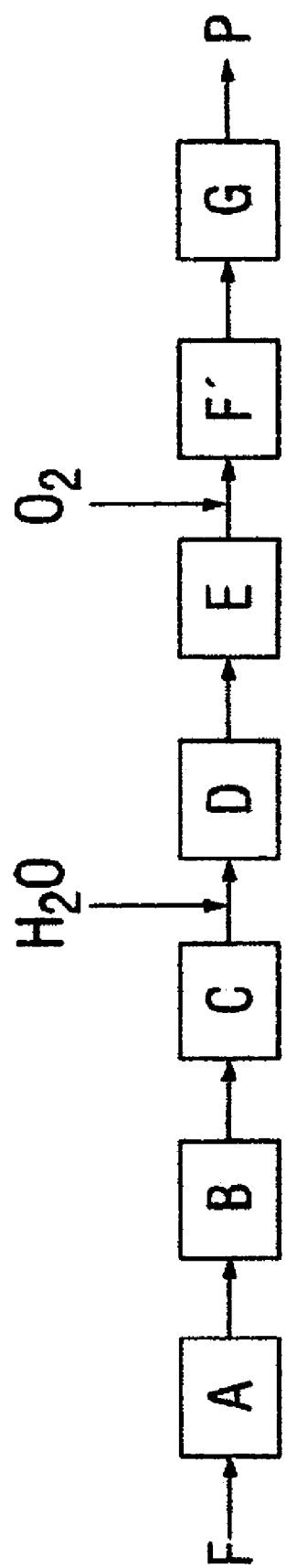
FIG. 1 depicts a simple process flow diagram for one illustrative embodiment of the present invention.

FIG. 1 depicts a general process flow diagram illustrating the process steps included in the illustrative embodiments of the present invention. One of skill in the art should appreciate that a certain amount of progressive order is needed in the flow of the reactants through the reactors disclosed herein.

Process step A is an autothermal reforming process in which two reactions, partial oxidation (formula I, below) and optionally also steam reforming (formula II, below), are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3\,H_2 + CO \qquad (II)$$

The partial oxidation reaction occurs very quickly to the complete conversion of oxygen added and produces heat. The steam reforming reaction occurs slower and consumes heat. A higher concentration of oxygen in the feed stream favors partial oxidation whereas a higher concentration of water vapor favors steam reforming. Therefore, the ratios of oxygen to hydrocarbon and water to hydrocarbon become characterizing parameters. These ratios affect the operating temperature and hydrogen yield.

The operating temperature of the autothermal reforming step can range from about 550° C. to about 900° C., depending on the feed conditions and the catalyst. The invention uses a catalyst bed of a partial oxidation catalyst with or without a steam reforming catalyst. The catalyst may be in any form including pellets, spheres, extrudate, monoliths, and the like. Partial oxidation catalysts should be well known to those with skill in the art and are often comprised of noble metals such as platinum, palladium, rhodium, and/or ruthenium on an alumina washcoat on a monolith, extrudate, pellet or other support. Non-noble metals such as nickel or cobalt have been used. Other washcoats such as titania, zirconia, silica, and magnesia have been cited in the literature. Many additional materials such as lanthanum, cerium, and potassium have been cited in the literature as "promoters" that improve the performance of the partial oxidation catalyst.

Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

Process step B is a cooling step for cooling the synthesis gas stream from process step A to a temperature of from about 200° C. to about 600° C., preferably from about 300° C. to about 500° C., and more preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream. One illustrative embodiment for step B is the use of a heat exchanger utilizing feed stream F as the coolant circulated through the heat exchanger. The heat exchanger can be of any suitable construction known to those with skill in the art including shell and tube, plate, spiral, etc. Alternatively, or in addition thereto, cooling step B may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art.

Process step C is a purifying step. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet etc.). Desulfurization is accomplished by converting the hydrogen sulfide to water in accordance with the following reaction formula III:

$$H_2S + ZnO \rightarrow H_2O + ZnS \qquad (III)$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The effluent stream may then be sent to a mixing step D in which water is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G disclosed below.

Process step E is a water gas shift reaction that converts carbon monoxide to carbon dioxide in accordance with formula IV:

$$H_2O + CO \rightarrow H_2 + CO_2 \qquad (IV)$$

This is an important step because carbon monoxide, in addition to being highly toxic to humans, is a poison to fuel cells. The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like.

High temperature shift catalysts are preferably operated at temperatures ranging from about 300° to about 600° C. and can include transition metal oxides such as ferric oxide or chromic oxide, and optionally including a promoter such as copper or iron silicide. Also included, as high temperature shift catalysts are supported noble metals such as supported platinum, palladium and/or other platinum group members.

The processing core utilized to carry out this step can include a packed bed of high temperature or low temperature shift catalyst such as described above, or a combination of both high temperature and low temperature shift catalysts. The process should be operated at any temperature suitable for the water gas shift reaction, preferably at a temperature of from 150° C. to about 400° C. depending on the type of catalyst used. Optionally, a cooling element such as a cooling coil may be disposed in the processing core of the shift reactor to lower the reaction temperature within the packed bed of catalyst. Lower temperatures favor the conversion of carbon monoxide to carbon dioxide. Also, a purification processing step C can be performed between high and low shift conversions by providing separate steps for high temperature and low temperature shift with a desulfurization module between the high and low temperature shift steps.

Process step F' is a cooling step performed in one embodiment by a heat exchanger. The heat exchanger can be of any suitable construction including shell and tube, plate, spiral, etc. Alternatively a heat pipe or other form of heat sink may be utilized. The goal of the heat exchanger is to reduce the temperature of the gas stream to produce an effluent having a temperature preferably in the range of from about 90° C. to about 150° C.

Oxygen is added to the process in step F'. The oxygen is consumed by the reactions of process step G described below. The oxygen can be in the form of air, enriched air, or substantially pure oxygen. The heat exchanger may by design provide mixing of the air with the hydrogen rich gas. Alternatively, the embodiment of process step D may be used to perform the mixing.

Process step G is an oxidation step wherein almost all of the remaining carbon monoxide in the effluent stream is converted to carbon dioxide. The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use.

Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \qquad (V)$$

$$H_2 + \tfrac{1}{2}O_2 \rightarrow H_2O \qquad (VI)$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G preferably reduces the carbon monoxide level to less than 50 ppm, which is a suitable level for use in fuel cells, but one of skill in the art should appreciate that the present invention can be adapted to produce a hydrogen rich product with of higher and lower levels of carbon monoxide.

The effluent exiting the fuel processor is a hydrogen rich gas P containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

Figure 2:
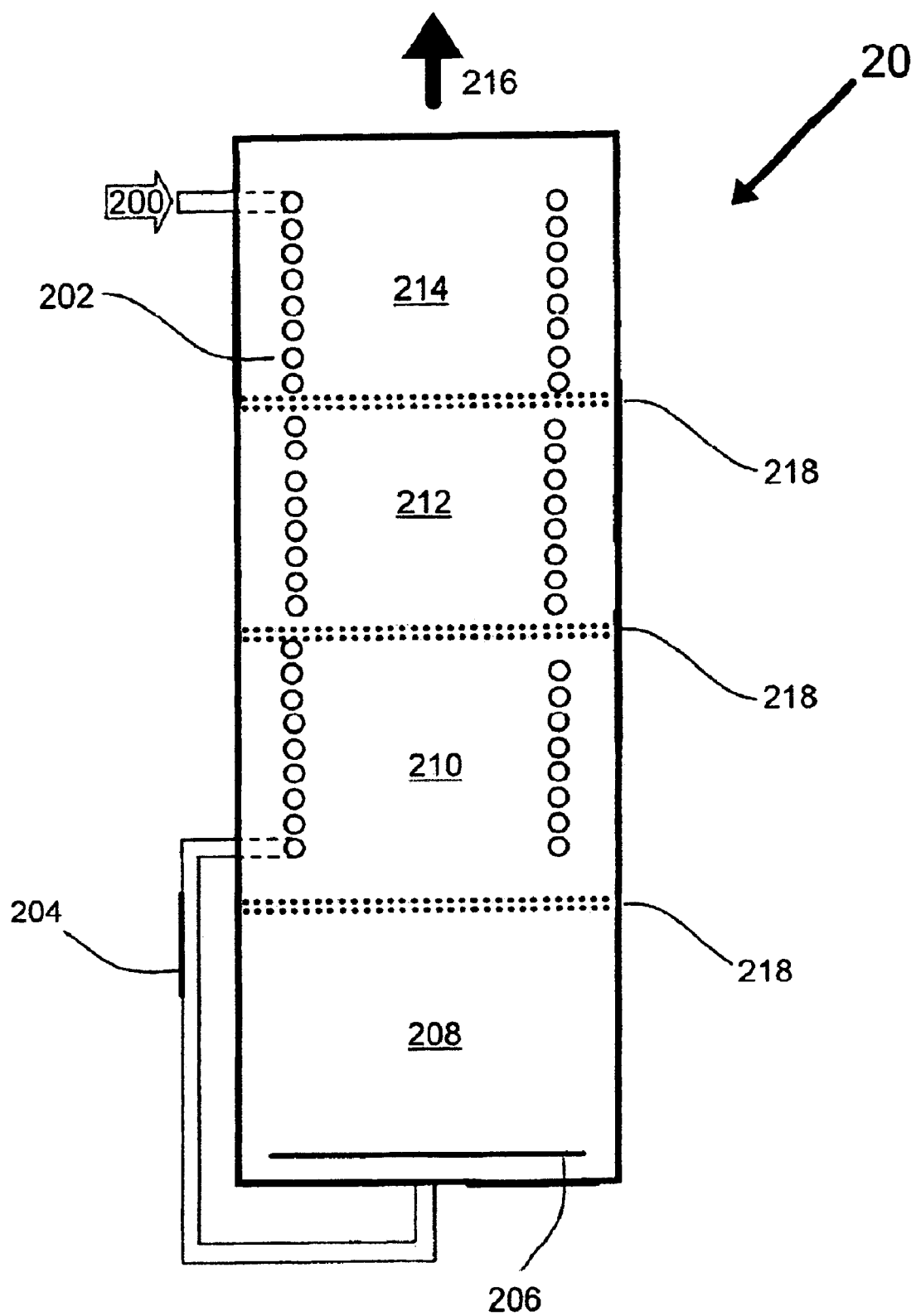
FIG. 2 depicts a first illustrative embodiment of a compact fuel processor apparatus of the present invention.

FIG. 2 depicts a cross-sectional view of a fuel processor 20 that is an illustrative embodiment of the present invention. One of ordinary skill in the art should see and appreciate that fuel or alternatively a fuel/oxygen or alternatively a fuel/oxygen/water mixture 200, is introduced to the inlet end of a coiled tubing heat exchanger 202. The heat exchanger is positioned within the fuel processor such that the heat exchanger substantially extends the length of the fuel processor. The heat exchanger pre-heats the fuel as well as cools/controls the temperature of the various reaction zones. One of skill in the art should appreciate that a number of factors effect the heat transfer process including the flow rate of fuel, the fuels heat capacity, the number of coils present in any particular reaction zone, the diameter of the tubing used to make the coils, the presence or absence of fins on the coils and so forth. However, such heat transfer considerations can be optimized through routine calculations and experimentation. The preheated fuel leaves the heat exchanger and is routed to the first reaction zone 208 by a reactor feed tube 204. The reactor feed tube may include flow control devices, and the like to condition and optimize the fuel mixture prior to introduction into the first reaction zone 208. The first reaction zone 208 in the present illustrative embodiment is packed with a autothermal reforming reaction catalyst. Such catalyst may be in pellet form or supported on a monolith. In some instances a distribution plate 206 may be needed to achieve an even distribution of fuel to the entire first reaction zone. Also optionally an electric preheater (not shown) may be utilized in the start-up of the fuel processor. After the fuel has reacted in the first reaction zone to form a hydrogen rich gas, the natural flow of the gas due to pressure is for the hydrogen rich gas to flow into the second reaction zone 210. In the present illustrative embodiment, the second reaction zone is packed with a desulfurization catalyst, preferably zinc oxide. Passage of the hydrogen rich gas over a desulfurization catalyst, such as zinc oxide, substantially reduces the concentration of sulfur containing compounds in the hydrogen rich gas stream. The desulfurized hydrogen rich gas is then passed into the $3^{rd}$ reaction zone 212. The third reaction zone of the present illustrative embodiment is packed with a water-gas shift reactor catalyst or mixture of such catalyst as discussed above. The passage of the hydrogen rich gas over this catalyst further enriches the hydrogen content and reduces the carbon monoxide concentration. The hydrogen rich gas is then passed onto the fourth reaction zone 214 which contains a preferential oxidation catalyst. Such a catalyst will reduce the carbon monoxide concentration to preferably less that 50 part per million as discussed above. In some instances air or another suitable oxygen source may be injected into the fourth reaction zone so that the preferential oxidation reaction is optimized. This may be accomplished by well-known means such as a simple gas injection tube (not show) inserted into the partial oxidation catalyst bed. In one preferred embodiment porous tube is substantially incorporated into the design of the preferential oxidation reaction zone design and is designed such that an even distribution of injected oxygen is achieved. The final product is a hydrogen rich gas 216. It should also be noted that in one preferred and illustrative embodiment, an inert but porous and flexible material such as glass wool, ceramic wool, rock wool, or other similar inert material may be used in the reaction zone transition regions 218. Such a material serves to aid in the packing of the reactor with the various catalysts, assists in preventing inadvertent mixing of catalysts during transport and provides a cushioning or buffer zone between each of the differing reaction zones. The hydrogen rich gas is preferably used in a fuel cell or may be stored or used in other processes that should be apparent to one of skill in the art.

One of skill in the art after reviewing the above description of FIG. 2 should understand and appreciate that each module performs a separate operational function. Feed stream F (200) is introduced through inlet pipe (not shown) and product gas P 216 is drawn off via outlet pipe (not shown). Reaction zone 208 is the autothermal reforming reaction zone corresponding to process step A of FIG. 1. An electric heater (not shown) may be installed at the bottom inlet of the reactor for start-up heat. Reaction zone 210 is a purifying reaction zone corresponding to process step C of FIG. 1. Reaction zone 212 is a water gas shift reaction zone corresponding to process step E of FIG. 1. The cooling step corresponding to process step F' of FIG. 1 is carried out by a heat exchanger 202. Reaction zone 214 is an oxidation step corresponding to process step G of FIG. 1. Air source (not shown) provides a source for oxygen to process gas for the oxidation reaction (Equation V) of reaction zone 214. Reaction zone 214 also contains a heat exchanger 202 positioned within or surrounding the catalyst bed so as to maintain a desired oxidation reaction temperature. One of skill in the art should appreciate that the process configuration described in this embodiment may vary depending on numerous factors, including but not limited to feedstock quality and required product quality.

Figure 3:
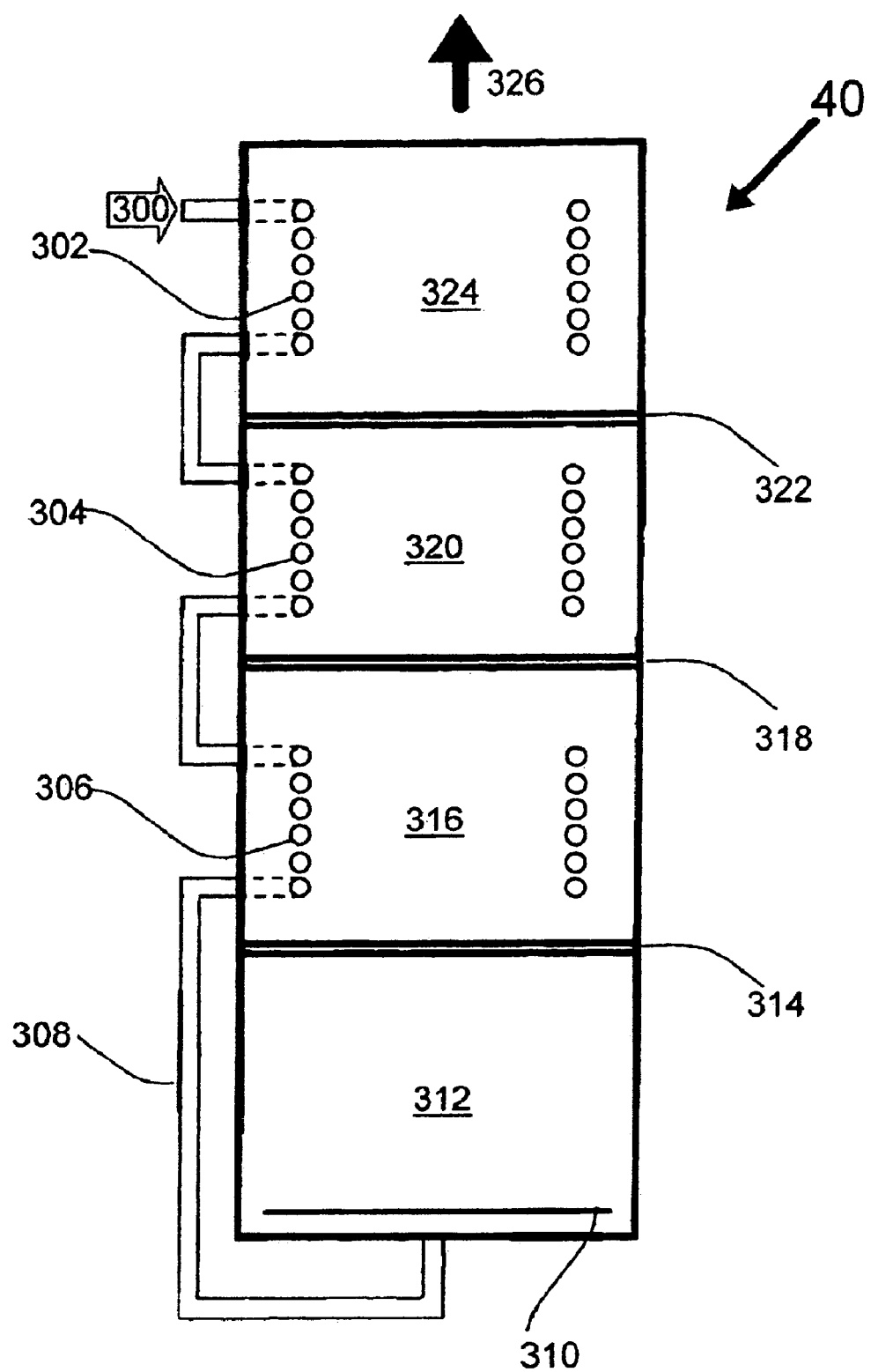
FIG. 3 depicts a second illustrative embodiment of a compact fuel processor apparatus of the present invention.

Considering now FIG. 3 a second illustrative embodiment of the present invention is depicted showing a fuel processor reaction chamber 40 in a cross-sectional view. One of ordinary skill in the art should understand and appreciate that fuel or alternatively a fuel/oxygen or alternatively a fuel/oxygen/water mixture 300, is introduced to the inlet end of a first coiled tubing heat exchanger 302. Each of the heat exchangers (302, 304, and 306) are preferably in fluid communication with each other. Each heat exchanger is positioned within the fuel processor such that the heat exchanger substantially extends the length of a particular reaction zone. The heat exchanger preheats the fuel as well as cools/controls the temperature of the various reaction zones.

One of skill in the art should appreciate that a number of factors effect the heat transfer process including the flow rate of fuel, the fuels heat capacity, the number of coils present in any particular reaction zone, the diameter of the tubing used to make the coils, the presence or absence of fins on the coils and so forth. However, such heat transfer considerations can be optimized through routine calculations and experimentation.

The preheated fuel leaves the heat exchanger and is routed to the first reaction zone 312 by a reactor feed tube 308. The reactor feed tube may include flow control devices, and the like to condition and optimize the fuel mixture prior to introduction into the first reaction zone 312. The first reaction zone 312 in the present illustrative embodiment is packed with a autothermal reforming reaction catalyst. Such catalyst may be in pellet form or supported on a monolith. In some instances a distribution plate 310 may be needed to achieve an even distribution of fuel to the entire first reaction zone. Also optionally an electric pre-heater (not shown) may be utilized in the start-up of the fuel processor. After the fuel has reacted in the first reaction zone to form a hydrogen rich gas, the natural flow of the gas due to pressure is to flow past the first support plate 314 and thus flow into the second reaction zone 316. In the present illustrative embodiment, the second reaction zone is packed with a desulfurization catalyst, preferably zinc oxide. Passage of the hydrogen rich gas over a desulfurization catalyst, such as zinc oxide, substantially reduces the concentration of sulfur containing compounds in the hydrogen rich gas stream. The temperature of the second reaction zone is at least partially controlled by the third heat exchanger 306. The desulfurized hydrogen rich gas is then passed through the second support plate 318 into the third reaction zone 320. The third reaction zone of the present illustrative embodiment is packed with a water-gas shift reactor catalyst or mixture of such catalyst as discussed above. The passage of the hydrogen rich gas over this catalyst further enriches the hydrogen content and reduces the carbon monoxide concentration. The temperature of the third reaction zone is at least partially controlled by the second heat exchanger 304. The hydrogen rich gas is then passed through the third support plate 322 and into the fourth reaction zone 324 which contains a preferential oxidation catalyst. Such a catalyst will reduce the carbon monoxide concentration to preferably less that 50 part per million as discussed above. In some instances air or another suitable oxygen source may be injected into the fourth reaction zone so that the preferential oxidation reaction is optimized. This may be accomplished by well known means such as a simple gas injection tube (not show) inserted into the partial oxidation catalyst bed. In one preferred embodiment porous tube is substantially incorporated into the design of the preferential oxidation reaction zone design and is designed such that an even distribution of injected oxygen is achieved. The temperature of this fourth reaction zone is at least partially controlled by the first heat exchanger 302 which simultaneously preheats the incoming fuel and cools the final product gas exiting the reactor. The final product is a hydrogen rich gas 326. It should also be noted that each of the reaction zones in the illustrative embodiment is separated from any adjacent reaction zone by an inert but porous support plate. Such a support plate is preferably a rigid relatively unreactive under the conditions in the reactor material used in the reaction zone transition regions. Such a material serves to aid in the packing of the reactor with the various catalysts, assists in preventing inadvertent mixing of catalysts during transport and provides a cushioning or buffer zone between each of the differing reaction zones. The hydrogen rich gas is preferably used in a fuel cell or may be stored or used in other processes that should be apparent to one of skill in the art.

One of skill in the art after reviewing the above description of FIG. 3 should understand and appreciate that each module performs a separate operational function. Feed stream F (300) is introduced through inlet pipe (not shown) and product gas P 326 is drawn off via outlet pipe (not shown). Reaction zone 312 is the autothermal reforming reaction zone corresponding to process step A of FIG. 1. An electric heater (not shown) is optionally installed at the bottom of the reactor for start-up heat. Reaction zone 316 is a purifying reaction zone corresponding to process step C of FIG. 1. Reaction zone 320 is a water gas shift reaction zone corresponding to process step E of FIG. 1. The cooling step corresponding to process step F' of FIG. 1 is carried out by a heat exchanger 304. Reaction zone 324 is an oxidation step corresponding to process step G of FIG. 1. Air source (not shown) provides a source for oxygen to process gas for the oxidation reaction (Equation V) of reaction zone 324. Reaction zone 324 also contains a heat exchanger 320 positioned within or surrounding the catalyst bed so as to maintain a desired oxidation reaction temperature. One of skill in the art should appreciate that the process configuration described in this embodiment may vary depending on numerous factors, including but not limited to feedstock quality and required product quality.

In view of the above disclosure, one of ordinary skill in the art should understand and appreciate that the present invention includes many possible illustrative embodiments that depend upon design criteria. One such illustrative embodiment includes a compact fuel processor for converting a hydrocarbon fuel feed into hydrogen rich gas, in which the fuel processor assembly includes a cylinder having an inlet end and an outlet end, wherein the cylinder is loaded with a plurality of catalysts in series fashion thus forming a series of reaction zones; and a heat exchanger having an inlet end and an outlet end, wherein the heat exchanger is internally positioned through the length of the cylinder so as to provide heat or remove heat as required by a particular reaction zone. Within such an illustrative embodiment, the plurality of catalysts includes autothermal reforming catalyst, desulfurization catalyst, water gas shift catalyst, preferential oxidation catalyst, and mixtures and combinations of these and similar catalysts. In one preferred illustrative embodiment, the heat exchanger is not positioned within the autothermal reforming catalyst. The hydrocarbon fuel feed utilized in the illustrative fuel processor is preheated, preferably by passing through the heat exchanger prior to being introduced to the cylinder or alternatively by a fuel preheater located in a function upstream position from the autothermal reforming reaction zone. A wide variety of hydrocarbon fuels may be utilized, however, in one illustrative embodiment the hydrocarbon fuel is selected form natural gas, gasoline, diesel, fuel oil, propane, liquefied petroleum, methanol, ethanol or other similar and suitable hydrocarbons and mixtures of these. It is preferred in one illustrative embodiment that the cylinder is oriented substantially vertically with the outlet end of the cylinder being on top and the flow of reactants being generally upward from the inlet end to the outlet end.

One of skill in the art should also understand and appreciate that another illustrative embodiment of the present invention includes a compact fuel processor for converting a hydrocarbon fuel feed to hydrogen rich gas, that is composed of a reaction chamber; a plurality of predefined reaction zones within said reaction chamber, wherein each reaction zone is characterized by the chemical reaction that takes place within the reaction zone.; and a heat exchanger having an inlet end and an outlet end, wherein the heat exchanger is positioned at least partially within the reaction chamber. In one such illustrative embodiment, a first reaction zone contains autothermal reforming catalyst, a second reaction zone contains desulfurization catalyst, a third reaction zone contains water gas shift catalyst, and a reaction zone module contains preferential oxidation catalyst. When considering such an illustrative embodiment, it is contemplated that the heat exchanger is not substantially positioned within the first reaction zone. The hydrocarbon fuel feed for one illustrative embodiment is preheated by passing through the heat exchanger prior to being introduced to the reaction chamber. Alternatively, the mixture of hydrocarbon fuel feed, air, and water is preheated by passing through the heat exchanger prior to being introduced to the first reaction zone. A wide variety of hydrocarbon fuels may be utilized, however, in one illustrative embodiment the hydrocarbon fuel is selected form natural gas, gasoline, diesel, fuel oil, propane, liquefied petroleum, methanol, ethanol or other similar and suitable hydrocarbons and mixtures of these. In one preferred and illustrative embodiment, the inlet end of the heat exchanger is at the fourth reaction zone and the outlet end is at the second reaction zone.

It should be appreciated a by one of skill in the art that each reaction zone of the plurality of reaction zones may contain one or more catalysts. In one such illustrative embodiment, the catalysts are selected from autothermal reforming catalyst, desulfurization catalyst, water gas shift catalyst, preferential oxidation catalyst as well as mixtures and combinations of these and similar catalysts. Any particular reaction zone containing more than one catalyst may be separated from an adjacent reaction zone by a permeable plate that also serves to support the adjacent reaction zones.

In one illustrative embodiment, the plate is selected from perforated metal, metal screen, metal mesh, sintered metal, porous ceramic, or combinations of these materials and similar materials. It is preferred within such an illustrative embodiment that the plate be at least partially composed of INCONEL® (a trademark registered for use in association with nickel alloys and alloys of nickel, chromium and iron), carbon steel, and stainless steel.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A compact fuel processor for converting a hydrocarbon fuel feed to hydrogen rich gas, comprising:
    a cylinder having an inlet end and an outlet end, wherein the cylinder is loaded with a plurality of catalysts in series fashion thus forming a series of reaction zones, the plurality of catalysts comprises an autothermal reforming catalyst packed in a first reaction zone;
    a heat exchanger having an inlet end and an outlet end, wherein the heat exchanger is internally positioned through the length of the cylinder so as to provide heat or remove heat as required by a particular reaction zone, wherein the heat exchanger is not positioned within the autothermal reforming catalyst; and
    a reactor feed tube for routing a preheated fuel from the heat exchanger to the first reaction zone.

2. The compact fuel processor of claim 1, wherein the plurality of catalysts comprises desulfurization catalyst, water gas shift catalyst, and preferential oxidation catalyst.

3. The compact fuel processor of claim 2, wherein the hydrocarbon fuel feed is preheated by passing through the heat exchanger prior to being introduced to the cylinder.

4. The compact fuel processor of claim 2, wherein the hydrocarbon is selected from the group consisting of natural gas, gasoline, diesel, fuel oil, propane, liquefied petroleum, methanol, ethanol, and mixtures of these.

5. The compact fuel processor of claim 1, wherein the inlet end of the heat exchanger is at the outlet end of the cylinder.

6. The compact fuel processor of claim 1, wherein the cylinder is oriented substantially vertically with the outlet end of the cylinder being on top.

7. A compact fuel processor for converting a hydrocarbon fuel feed to hydrogen rich gas, comprising:
    a reaction chamber;
    a plurality of predefined reaction zones within said reaction chamber, wherein each reaction zone is characterized by the chemical reaction that takes place within the reaction zone, and wherein a first reaction zone contains autothermal reforming catalyst;
    a heat exchanger having an inlet end and an outlet end, wherein the heat exchanger is positioned within the reaction chamber, wherein the heat exchanger is not positioned within the first reaction zone; and
    a reactor feed tube for routing a preheated fuel from the heat exchanger to the first reaction zone.

8. The compact fuel processor of claim 7, wherein a second reaction zone contains desulfurization catalyst, a third reaction zone contains water gas shift catalyst, and a fourth reaction zone contains preferential oxidation catalyst.

9. The compact fuel processor of claim 7, wherein the hydrocarbon fuel feed is preheated by passing through the heat exchanger prior to being introduced to the reaction chamber.

10. The compact fuel processor of claim 7, wherein a mixture of hydrocarbon fuel feed, air, and water is preheated by passing through the heat exchanger prior to being introduced to the first reaction zone.

11. The compact fuel processor of claim 8, wherein the inlet end of the heat exchanger is at the fourth reaction zone and the outlet end is at the second reaction zone.

12. The compact fuel processor of claim 7, wherein each reaction zone of the plurality of reaction zones may contain one or more catalysts selected from the group consisting of autothermal reforming catalyst, desulfurization catalyst, water gas shift catalyst, and preferential oxidation catalyst.

13. The compact fuel processor of claim 12, wherein a reaction zone containing more than one catalyst is separated from an adjacent reaction zone and is supported by a permeable plate.

14. The compact fuel processor of claim 13, wherein the plate is selected from the group consisting of perforated metal, metal screen, metal mesh, sintered metal and porous ceramic.

* * * * *